(12) United States Patent
Tchapmi et al.

(10) Patent No.: US 11,004,202 B2
(45) Date of Patent: May 11, 2021

(54) SYSTEMS AND METHODS FOR SEMANTIC SEGMENTATION OF 3D POINT CLOUDS

(71) Applicant: The Board of Trustees of the Leland Stanford Junior University, Stanford, CA (US)

(72) Inventors: Lyne P. Tchapmi, Stanford, CA (US); Christopher B. Choy, Stanford, CA (US); Iro Armeni, Stanford, CA (US); JunYoung Gwak, Stanford, CA (US); Silvio Savarese, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 201 days.

(21) Appl. No.: 16/155,843

(22) Filed: Oct. 9, 2018

(65) Prior Publication Data

US 2019/0108639 A1 Apr. 11, 2019

Related U.S. Application Data

(60) Provisional application No. 62/569,951, filed on Oct. 9, 2017.

(51) Int. Cl.
*G06T 7/10* (2017.01)
*G06T 1/20* (2006.01)
(Continued)

(52) U.S. Cl.
CPC ............. *G06T 7/10* (2017.01); *G06K 9/00* (2013.01); *G06N 3/084* (2013.01); *G06N 5/04* (2013.01);
(Continued)

(58) Field of Classification Search
None
See application file for complete search history.

(56) References Cited

U.S. PATENT DOCUMENTS 9,633,483 B1 * 4/2017 Xu .................... G06T 17/10
10,650,278 B1 * 5/2020 Ho .................... G06T 7/11
(Continued)

OTHER PUBLICATIONS

Conditional Random Fields as Recurrent Neural Networks. Zheng et al. (Year: 2016).*

(Continued)

*Primary Examiner* — Delomia L Gilliard
(74) *Attorney, Agent, or Firm* — KPPB LLP

(57) ABSTRACT

Systems and methods for obtaining 3D point-level segmentation of 3D point clouds in accordance with various embodiments of the invention are disclosed. One embodiment includes: at least one processor, and a memory containing a segmentation pipeline application. In addition, the segmentation pipeline application configures the at least one processor to: pre-process a 3D point cloud to group 3D points; provide the groups of 3D points to a 3D neural network to generate initial label predictions for the groups of 3D points; interpolate label predictions for individual 3D points based upon initial label predictions for at least two neighboring groups of 3D points including the group of 3D points to which a given individual 3D point belongs; refine the label predictions using a graph neural network; and output a segmented 3D point cloud.

20 Claims, 12 Drawing Sheets
(6 of 12 Drawing Sheet(s) Filed in Color)

(51) Int. Cl.
  G06N 5/04    (2006.01)
  G06T 3/40    (2006.01)
  G06N 3/08    (2006.01)
  G06K 9/00    (2006.01)
  G06T 7/11    (2017.01)
  G06T 7/143   (2017.01)
(52) U.S. Cl.
  CPC .............. *G06T 1/20* (2013.01); *G06T 3/4007* (2013.01); *G06T 7/11* (2017.01); *G06T 7/143* (2017.01); *G06T 2207/10028* (2013.01); *G06T 2207/20081* (2013.01); *G06T 2207/20084* (2013.01)

(56) References Cited

U.S. PATENT DOCUMENTS

| | | | | |
|---|---|---|---|---|
| 2010/0328308 | A1* | 12/2010 | Gamliel | G06T 17/20 345/420 |
| 2015/0161101 | A1* | 6/2015 | Yao | G06N 3/02 704/9 |
| 2016/0062948 | A1* | 3/2016 | Fenney | G06F 17/175 708/290 |
| 2016/0063754 | A1* | 3/2016 | Korchev | G06T 15/205 345/424 |
| 2016/0117858 | A1* | 4/2016 | Wu | G06T 17/205 345/420 |
| 2016/0154999 | A1* | 6/2016 | Fan | G06K 9/00201 382/103 |
| 2017/0177997 | A1* | 6/2017 | Karlinsky | G06K 9/6271 |
| 2017/0200092 | A1* | 7/2017 | Kisilev | G06N 20/00 |
| 2017/0262735 | A1* | 9/2017 | Ros Sanchez | G06K 9/481 |
| 2018/0053107 | A1* | 2/2018 | Wang | G06F 40/30 |
| 2018/0059679 | A1* | 3/2018 | Taimouri | G06N 3/08 |
| 2018/0122137 | A1* | 5/2018 | Tian | G06T 7/521 |
| 2018/0247447 | A1* | 8/2018 | Serna | G06T 15/40 |
| 2018/0253622 | A1* | 9/2018 | Chen | G06K 9/627 |
| 2019/0130575 | A1* | 5/2019 | Chen | G06N 3/084 |
| 2019/0158813 | A1* | 5/2019 | Rowell | H04N 13/239 |
| 2019/0171936 | A1* | 6/2019 | Karras | G06N 3/0445 |
| 2019/0294970 | A1* | 9/2019 | Fidler | G06N 20/00 |

OTHER PUBLICATIONS

SEGCloud:Sennantic Segmentation of 3D Point Clouds. Tchapmi et al. (Year: 2017).*

Lafferty et al., "Conditional Random Fields: Probabilistic Models for Segmenting and Labeling Sequence Data", Proceedings of the Eighteenth International Conference on Machine Learning, Jun. 28-Jul. 1, 2001, pp. 282-289.

Lalonde et al., "Natural Terrain Classification using Three-Dimensional Ladar Datafor Ground Robot Mobility", Journal of Field Robotics, vol. 23, No. 10, Oct. 2006, pp. 839-861.

Lawin et al., "Deep Projective 3D Semantic Segmentation", arXiv:1705.03428v1 [cs.CV], May 9, 2017, 12 pgs.

Long et al., "Fully Convolutional Networks for Semantic Segmentation", In Proceedings of the IEEE Conference on Computer Vision and Pattern Recognition, 2015, pp. 3431-3440.

Lu et al., "Simplified Markov Random Fields for Efficient Semantic Labeling of 3D Point Clouds", Proceedings of the IEEE/RSJ International Conference on Intelligent Robots and Systems, Vilamoura, Portugal, Oct. 7-12, 2012, 8 pgs.

Martinovic et al., "3D All the Way: Semantic Segmentation of Urban Scenes From Start to End in 3D", Proceedings of the IEEE Conference on Computer Vision and Pattern Recognition (CVPR), Boston, Massachusetts, Jun. 7-12, 2015, 10 pgs.

Maturana et al., "VoxNet: A 3D Convolutional Neural Network for Real-Time Object Recognition", Proceedings of the IEEE/RSJ International Conference on Intelligent Robots and Systems (IROS), Hamburg, Germany, Sep. 28-Oct. 2, 2015, 7 pgs.

Meijering, "A Chronology of Interpolation: From Ancient Astronomy to Modern Signal and Image Processing", Proceedings of the IEEE, vol. 90, No. 3, Mar. 2002, pp. 319-342.

Munoz et al., "Co-inference for multi-modal scene analysis", Proceedings of the 12th European conference on Computer Vision, vol. Part VI, Florence, Italy, Oct. 7-13, 2012, pp. 668-681.

Munoz et al., "Directional Associative Markov Network for 3-D Point Cloud Classification", Proceedings of the Fourth International Symposium on 3D Data Processing, Visualization and Transmission, Jun. 2008, 8 pgs.

Munoz et al., "Onboard Contextual Classification of 3-D Point Clouds with Learned High-order Markov Random Fields", Proceedings of the 2009 IEEE international conference on Robotics and Automation, Kobe, Japan, May 12-17, 2009, pp. 4273-4280.

Nan et al., "A Search-Classify Approach for Cluttered Indoor Scene Understanding", ACM Transactions on Graphics, 2012, vol. 31, No. 6, 10 pgs.

Qi et al., "PointNet: Deep Learning on Point Sets for 3D Classification and Segmentation", Proceedings of the IEEE Conference on Computer Vision and Pattern Recognition (CVPR), Honolulu, Hawaii, Jul. 21-26, 2017, 9 pgs.

Qi et al., "Volumetric and Multi-View CNNs for Object Classification on 3D Data", Proceedings of the IEEE Conference on Computer Vision and Pattern Recognition (CVPR), Las Vegas, Nevada, Jun. 27-30, 2016, 9 pgs.

Riegler et al., "OctNet: Learning Deep 3D Representations at High Resolutions", Proceedings of the IEEE Conference on Computer Vision and Pattern Recognition (CVPR), Honolulu, Hawaii, Jul. 21-26, 2017, pp. 3577-3586.

Riemenschneider et al., "Learning Where to Classify in Multi-view Semantic Segmentation", European Conference on Computer Vision, 2014, pp. 516-532.

Russakovsky et al., "ImageNet Large Scale Visual Recognition Challenge", arXiv:1409.0575v3 [cs.CV], Jan. 30, 2015, 43 pgs.

Shapovalov et al., "Non-Associative Markov Networks for 3D Point Cloud Classification", International Archives of the Photogrammetry, Remote Sensing and Spatial Information Sciences XXXVIII, Part 3A, 2010, pp. 103-108.

Silberman et al., "Indoor segmentation and support inference from RGBD images", ECCV'12 Proceedings of the 12th European conference on Computer Vision, vol. Part V, Oct. 7-13, 2012, Florence, Italy, pp. 746-760.

Song et al., "Deep Sliding Shapes for Amodal 3D Object Detection in RGB-D Images", Proceedings of the IEEE Conference on Computer Vision and Pattern Recognition (CVPR), Las Vegas, Nevada, Jun. 27-30, 2016, 9 pgs.

Song et al., "SUN RGB-D: A RGB-D Scene Understanding Benchmark Suite", Proceedings of the IEEE Conference on Computer Vision and Pattern Recognition (CVPR), Boston, Massachusetts, Jun. 7-12, 2015, pp. 567-576.

Taskar et al., "Learning Associative Markov Networks", Proceedings of the Twenty-First International Conference on Machine Learning, Banff, Alberta, Canada, Jul. 4-8, 2004, 10 pgs.

Taskar et al., "Max-Margin Markov Networks", Proceedings of the 16th International Conference on Neural Information Processing Systems, Whistler, British Columbia, Canada, Dec. 9-11, 2003, pp. 25-32.

Tchapmi et al., "SEGCloud: Semantic Segmentation of 3D Point Clouds", arXiv, Retrieved from: https://arxiv.org/pdf/1710.07563.pdf, Oct. 20, 2017, 21 pgs.

Tchapmi et al., "Supplementary Material for SEGCloud: Semantic Segmentation of 3D Point Clouds", Stanford University, Retrieved from: http://segcloud.stanford.edu, 10 pgs.

Tran et al., "Learning Spatiotemporal Features with 3D Convolutional Networks", Proceedings of the IEEE International Conference on Computer Vision (ICCV), Santiago, Chile, Dec. 7-13, 2015, 9 pgs.

Wang et al., "An Efficient Scene Semantic Labeling Approach for 3D Point Cloud", Proceedings in the IEEE 18th International Conference on Intelligent Transportation Systems, Las Palmas, Spain, Sep. 15-18, 2015.

(56) References Cited

OTHER PUBLICATIONS

Wang et al., "Multi-modal Unsupervised Feature Learning for RGB-D Scene Labeling", European Conference on Computer Vision, 2014, pp. 453-467.
Weinmann et al., "Semantic 3D Scene Interpretation: A Framework Combining Optimal Neighborhood Size Selection with Relevant Features", ISPRS Annals of the Photogrammetry, Remote Sensing and Spatial Information Sciences, vol. II-3, ISPRS Technical Commission III Symposium, Zurich, Switzerland, Sep. 5-7, 2014, 8 pgs.
Wolf et al., "Enhancing Semantic Segmentation for Robotics: The Power of 3D Entangled Forests", IEEE Robotics and Automation Letters, vol. 1, No. 1, Jan. 2016, pp. 49-56.
Wolf et al., "Fast Semantic Segmentation of 3D Point Clouds using a Dense CRF with Learned Parameters", Proceedings of the IEEE International Conference on Robotics and Automation (ICRA), Seattle, Washington, May 26-30, 2015, 7 pgs.
Wu et al., "Learning a Probabilistic Latent Space of Object Shapes via 3D Generative-Adversarial Modeling", Proceedings of the 30th International Conference on Neural Information Processing Systems, Barcelona, Spain, Dec. 5-10, 2016, pp. 82-90.
Wu et al., "Single Image 3D Interpreter Network", arXiv:1604.08685v2 [cs.CV], Oct. 4, 2016, 18 pgs.
Xiao et al., "SUN3D: A Database of Big Spaces Reconstructed Using SfM and Object Labels", IEEE Computer Vision, 2013, pp. 1625-1632.
Yan et al., "Perspective Transformer Nets: Learning Single-View 3D Object Reconstruction without 3D Supervision", Proceedings of the 30th International Conference on Neural Information Processing Systems, Barcelona, Spain, Dec. 5-10, 2016, pp. 1704-1712.
Zhang et al., "Category Modeling from just a Single Labeling: Use Depth Information to Guide the Learning of 2D Models", Proceedings of the IEEE Conference on Computer Vision and Pattern Recognition (CVPR), 2013, pp. 193-200.
Zhang et al., "Sensor Fusion for Semantic Segmentation of Urban Scenes", Proceedings of the IEEE International Conference on Robotics and Automation (ICRA), Seattle, Washington, May 26-30, 2015, 8 pgs.
Adams et al., "Fast High-Dimensional Filtering Using the Permutohedral Lattice", Computer Graphics Forum, vol. 29, No. 2, May 2010, pp. 753-762.
Aijazi et al., "Segmentation Based Classification of 3D Urban Point Clouds: A Super-Voxel Based Approach with Evaluation", Remote Sensing, vol. 5, No. 4, Mar. 28, 2013, pp. 1624-1650.
Anand et al., "Contextually Guided Semantic Labeling and Search for 3D Point Clouds", The International Journal of Robotics Research, vol. 32, No. 1, Nov. 15, 2012, pp. 19-34.
Armeni et al., "3D Semantic Parsing of Large-Scale Indoor Spaces", Proceedings of the IEEE Conference on Computer Vision and Pattern Recognition (CVPR), Las Vegas, Nevada, Jun. 27-30, 2016, 10 pgs.
Armeni et al., "Joint 2D-3D-Semantic Data for Indoor Scene Understanding", arXiv:1702.01105v1 [cs.CV], Feb. 3, 2017, 9 pgs.
Boulch et al., "Unstructured point cloud semantic labeling using deep segmentation networks", Eurographics Workshop on 3D Object Retrieval, The Eurographics Association, 2017, 8 pgs.
Breiman, "Random Forests", Machine Learning, Oct. 2001, vol. 45, Issue 1, p. 5-32.
Brostow et al., "Segmentation and Recognition Using Structure from Motion Point Clouds", Proceedings of the 10th European Conference on Computer Vision: Part I, Marseille, France, Oct. 12-18, 2008, pp. 44-57.
Chehata et al., "Airborne LiDAR feature selection for urban classification using random forests", Proceedings of the ISPRS Workshop: Laserscanning, Paris, France, vol. XXXVIII, Part 3/W8, Sep. 1-2, 2009, pp. 207-212.
Chen et al., "DeepLab: Semantic Image Segmentation with Deep Convolutional Nets, Atrous Convolution, and Fully Connected CRFs", IEEE Transactions on Pattern Analysis and Machine Intelligence, 2018, vol. 40, No. 4, pp. 834-848, Xiv:1606.00915v1], Jun. 2, 2016.

Choy et al., "3D-R2N2: A Unified Approach for Single and Multi-view 3D Object Reconstruction", arXiv:1604.00449v1 [cs.CV], Apr. 2, 2016, 17 pgs.
Choy et al., "Universal Correspondence Network", Proceedings of the 30th Conference on Neural Information Processing Systems (NIPS 2016), Barcelona, Spain, 9 pgs.
Cohen et al., "Efficient Structured Parsing of Facades Using Dynamic Programming", Proceedings of the IEEE Conference on Computer Vision and Pattern Recognition, Columbus, Ohio, Jun. 23-28, 2014, 8 pgs.
Couprie et al., "Indoor Semantic Segmentation using depth information", arXiv:1301.3572v2 [cs.CV], Mar. 14, 2013, 8 pgs.
Dai et al., "ScanNet: Richly-annotated 3D Reconstructions of Indoor Scenes", arXiv:1702.04405 [cs.CV], Feb. 14, 2017, p. 5828-5839.
Dohan et al., "Learning Hierarchical Semantic Segmentations of LIDAR Data", Proceedings of the International Conference on 3D Vision (3DV), Oct. 2015, 9 pgs.
Eigen et al., "Predicting Depth, Surface Normals and Semantic Labels with a Common Multi-scale Convolutional Architecture", Proceedings of the IEEE International Conference on Computer Vision (ICCV), Santiago, Chile, Dec. 7-13, 2015, 9 pgs.
Fan et al., "A Point Set Generation Network for 3D Object Reconstruction from a Single Image", arXiv:1612.00603v2 [cs.CV], Dec. 7, 2016, 12 pgs.
Felzenszwalb et al., "Efficient Graph-Based Image Segmentation", International Journal of Computer Vision, vol. 59, No. 2, Sep. 2004, pp. 167-181.
Garcia-Garcia et al., "PointNet: A 3D Convolutional Neural Network for Real-Time Object Class Recognition", Proceedings of the International Joint Conference on Neural Networks (IJCNN), Vancouver, BC, Canada, Jul. 24-29, 2016, pp. 1578-1584.
Geiger, "Are we ready for Autonomous Driving? The KITTI Vision Benchmark Suite", Proceedings of the 2012 IEEE Conference on Computer Vision and Pattern Recognition (CVPR), Washington, DC, Jun. 16-21, 2012, pp. 3354-3361.
Geiger et al., "Vision meets Robotics: The KITTI Dataset", The International Journal of Robotics Research, 2013, 6 pgs.
Georgakis et al., "Multiview RGB-D Dataset for Object Instance Detection", arXiv:1609.07826v1 [cs.CV], Sep. 26, 2016, 9 pgs.
Guo et al., "3D Mesh Labeling via Deep Convolutional Neural Networks", ACM Transactions on Graphics (TOG), vol. 35, No. 1, Dec. 2015, pp. 3:1-3:12.
Hackel et al., "Fast Semantic Segmentation of 3D Point Clouds With Strongly Varying Density", ISPRS Annals of the Photogrammetry Remote Sensing Spatial Information Sciences, vol. III-3, Jun. 3, 2016, pp. 177-184.
Hackel et al., "semantic3d.net: A New Large-Scale Point Cloud Classification Benchmark", arXiv:1704.03847v1 [cs.CV], Apr. 12, 2017, 9 pgs.
He et al., "Deep residual learning for image recognition", arXiv:1512.03385 [cs.CV], in 2016 IEEE Conference on Computer Vision and Pattern Recognition, Dec. 10, 2015, pp. 770-778.
Hermans et al., "Dense 3D Semantic Mapping of Indoor Scenes from RGB-D Images", IEEE International Conference on Robotics & Automation (ICRA), 2014, Hong Kong Convention and Exhibition Center, May 31-Jun. 7, 2014, pp. 2531-2638.
Hu et al., "Efficient 3-D scene analysis from streaming data", Proceedings of the IEEE International Conference on Robotics and Automation, Karlsruhe, Germany, May 6-10, 2013, 8 pgs.
Hua et al., "SceneNN: A Scene Meshes Dataset with aNNotations", Proceedings of the Fourth International Conference on 3D Vision (3DV), Stanford, California, Oct. 25-28, 2016.
Huang et al., "Point cloud labeling using 3D Convolutional Neural Network", Proceedings of the 23rd International Conference on Pattern Recognition (ICPR), Cancun, Mexico, Dec. 4-8, 2016, 6 pgs.
Jia et al., "Caffe: Convolutional Architecture for Fast Feature Embedding", arXiv:1408.5093v1 [cs.CV], Jun. 20, 2014, 4 pgs.
Kamnitsas et al., "Efficient multi-scale 3D CNN with fully connected CRF for accurate brain lesion segmentation", Medical Image Analysis, vol. 36, Feb. 2017, pp. 61-78.

(56) References Cited

OTHER PUBLICATIONS

Kim et al., "3D Scene Understanding by Voxel-CRF", Proceedings of the IEEE International Conference on Computer Vision, Sydney, NSW, Australia, Dec. 1-8, 2013, 8 pgs.
Koppula et al., "Semantic labeling of 3D point clouds for indoor scenes", Proceedings of the 24th International Conference on Neural Information Processing Systems, Granada, Spain, Dec. 12-15, 2011, pp. 244-252.
Krahenbuhl et al., "Efficient Inference in Fully Connected CRFs with Gaussian Edge Potentials", Proceedings of the 24th International Conference on Neural Information Processing Systems, Granada, Spain, Dec. 12-15, 2011, pp. 109-117.
Ladicky et al., "Associative Hierarchical Random Fields", IEEE Transactions on Pattern Analysis and Machine Intelligence, vol. 36, No. 6, Jun. 2014, pp. 1056-1077.

\* cited by examiner

Table 1: Results on the Semantic3D.net Benchmark (*reduced-8 challenge*)

| Method | man-made terrain | natural terrain | high vegetation | low vegetation | buildings | hard scape | scanning artefacts | cars | mIOU | mAcc[3] |
|---|---|---|---|---|---|---|---|---|---|---|
| TMLC-MSR | 89.80 | 74.50 | 53.70 | 26.80 | 88.80 | 18.90 | 36.40 | 44.70 | 54.20 | 68.95 |
| DeePr3SS | 85.60 | 83.20 | 74.20 | 32.40 | 89.70 | 18.50 | 25.10 | 59.20 | 58.50 | 88.90 |
| SnapNet | 82.00 | 77.30 | 79.70 | 22.90 | 91.10 | 18.40 | 37.30 | 64.40 | 59.10 | 70.80 |
| 3D-FCNN-TI (Ours) | 84.00 | 71.10 | 77.00 | 31.80 | 89.90 | 27.70 | 25.20 | 59.00 | 58.20 | 69.86 |
| SEGCloud (Ours) | 83.90 | 66.00 | 86.00 | 40.50 | 91.10 | 30.90 | 27.50 | 64.30 | 61.30 | 73.08 |

FIG. 5

Table 2: Results on the Large-Scale 3D Indoor Spaces Dataset (S3DIS)

| Method | ceiling | floor | wall | beam | column | window | door | chair | table | bookcase | sofa | board | clutter | mIOU | mAcc |
|---|---|---|---|---|---|---|---|---|---|---|---|---|---|---|---|
| PointNet | 88.80 | 97.33 | 69.80 | 0.05 | 3.92 | 46.26 | 10.76 | 52.61 | 58.93 | 40.28 | 5.85 | 26.38 | 33.22 | 41.09 | 48.98 |
| 3D-FCNN-TI(Ours) | 90.17 | 96.48 | 70.16 | 0.00 | 11.40 | 33.36 | 21.12 | 76.12 | 70.07 | 57.89 | 37.46 | 11.16 | 41.61 | 47.46 | 54.91 |
| SEGCloud (Ours) | 90.06 | 96.05 | 69.86 | 0.00 | 18.37 | 38.35 | 23.12 | 75.89 | 70.40 | 58.42 | 40.88 | 12.96 | 41.60 | 48.92 | 57.35 |

FIG. 7

Table 3: Results on the NYUV2 dataset

| Method | Bed | Objects | Chair | Furniture | Ceiling | Floor | Deco. | Sofa | Table | Wall | Window | Booksh. | TV | mIOU | mAcc | glob Acc |
|---|---|---|---|---|---|---|---|---|---|---|---|---|---|---|---|---|
| Couprie et al. | 38.1 | 8.7 | 34.1 | 42.4 | 62.6 | 87.3 | 40.4 | 24.6 | 10.2 | 86.1 | 15.9 | 13.7 | 6.0 | - | 36.2 | 52.4 |
| Wang et al. | 47.6 | 12.4 | 23.5 | 16.7 | 68.1 | 84.1 | 26.4 | 39.1 | 35.4 | 65.9 | 52.2 | 45.0 | 32.4 | - | 42.2 | - |
| Hermans et al. | 68.4 | 8.6 | 41.9 | 37.1 | 83.4 | 91.5 | 35.8 | 28.5 | 27.7 | 71.8 | 46.1 | 45.4 | 38.4 | - | 48.0 | 54.2 |
| Wolf et al. | 74.56 | 17.62 | 62.16 | 47.85 | 82.42 | 98.72 | 26.36 | 69.38 | 48.57 | 83.65 | 25.56 | 54.92 | 31.05 | 39.51 | 55.6±0.2 | 64.9±0.3 |
| 3D-FCNN-TI(Ours) | 69.3 | 40.26 | 64.34 | 64.41 | 73.05 | 95.55 | 21.15 | 55.51 | 45.09 | 84.96 | 20.76 | 42.24 | 23.95 | 42.13 | 53.9 | 67.38 |
| SEGCloud (Ours) | 75.06 | 39.28 | 62.92 | 61.8 | 69.16 | 95.21 | 34.38 | 62.78 | 45.78 | 78.89 | 26.35 | 53.46 | 28.5 | 43.45 | 56.43 | 66.82 |

FIG. 8

Table 4: Results on the KITTI dataset.

| Method | building | sky | road | vegetation | sidewalk | car | pedestrian | cyclist | signage | fence | mIOU | mAcc |
|---|---|---|---|---|---|---|---|---|---|---|---|---|
| Zhang et al. | 86.90 | - | 89.20 | 55.00 | 26.20 | 50.0 | 49.00 | 19.3 | 51.7 | 21.1 | - | 49.80 |
| 3D-FCNN-TI (Ours) | 85.83 | - | 90.57 | 70.50 | 25.56 | 65.68 | 46.35 | 7.78 | 28.40 | 4.51 | 35.65 | 47.24 |
| SEGCloud (Ours) | 85.86 | - | 88.84 | 68.73 | 29.74 | 67.51 | 53.52 | 7.27 | 39.62 | 4.05 | 36.78 | 49.46 |

FIG. 9

Table 6: Effect of trilinear interpolation

| Method | mIOU |
|---|---|
| PointNet | 41.09 |
| Ours-NN (3D-FCNN-NN) | 44.84 |
| Ours (3D-FCNN-TI) | 47.46 |

*FIG. 12*

Table 5: Effect of Geometric Augmentation

| Method | mIOU |
|---|---|
| PointNet | 41.09 |
| Ours- no augm. (3D-FCNN-TI) | 43.67 |
| Ours (3D-FCNN-TI) | 47.46 |

*FIG. 10*

SYSTEMS AND METHODS FOR SEMANTIC SEGMENTATION OF 3D POINT CLOUDS

CROSS-REFERENCE TO RELATED APPLICATIONS

The present invention claims priority to U.S. Provisional Patent Application Ser. No. 62/569,951 entitled "SEGCloud: Semantic Segmentation of 3D Point Clouds" to Tchapmi, filed Oct. 9, 2017. The disclosure of U.S. Provisional Patent Application Ser. No. 62/569,951 is herein incorporated by reference in its entirety.

FIELD OF THE INVENTION

The present invention generally relates to the field of machine vision and more specifically to semantic segmentation of 3D point clouds.

BACKGROUND

Scene understanding is a core problem in Computer Vision and is fundamental to applications such as robotics, autonomous driving, augmented reality, virtual reality, and the construction industry. Among various scene understanding problems, 3D semantic segmentation allows finding accurate object boundaries along with their labels in 3D space, which is useful for fine-grained tasks such as object manipulation, detailed scene modeling and analysis.

Semantic segmentation of 3D point sets or point clouds has been addressed through a variety of methods leveraging the representational power of graphical models. A common paradigm is to combine a classifier stage and a Conditional Random Field (CRF) to predict spatially consistent labels for each data point. Random Forests classifiers have shown effective performance on this task, however the Random Forests classifier and CRF stage are often optimized independently and put together as separate modules, which limits the information flow between them.

SUMMARY OF THE INVENTION

Systems and methods for obtaining 3D point-level segmentation of 3D point clouds in accordance with various embodiments of the invention are disclosed. In a number of embodiments, coarse predictions of labels are obtained using a 3D NN and these coarse predictions are refined via 3D interpolation and use of a graph neural network.

One embodiment includes: at least one processor, and a memory containing a segmentation pipeline application. In addition, the segmentation pipeline application configures the at least one processor to: pre-process a 3D point cloud to group 3D points; provide the groups of 3D points to a 3D neural network to generate initial label predictions for the groups of 3D points; interpolate label predictions for individual 3D points based upon initial label predictions for at least two neighboring groups of 3D points including the group of 3D points to which a given individual 3D point belongs; refine the label predictions using a graph neural network; and output a segmented 3D point cloud.

In a further embodiment, the segmentation pipeline application configures the at least one processor to group 3D points into voxels; and the 3D neural network is a three dimensional fully convolutional neural network (3D-FCNN).

In another embodiment, the interpolation is a trilinear interpolation.

In a still further embodiment, the trilinear interpolation is implemented as an additional layer of the 3D-FCNN.

In still another embodiment, the trilinear interpolation of an initial label prediction for a given 3D point is based upon a weighted sum of the initial label predictions assigned to the eight nearest neighboring voxel centers to the given 3D point.

In a yet further embodiment, the weighted sum is based upon distance between the given 3D point and voxel centers.

In yet another embodiment, the graph neural network is a Conditional Random Field (CRF).

In a further embodiment again, the 3D neural network and the graph neural network are jointly trained.

In another embodiment again, the interpolation is a trilinear interpolation.

In a further additional embodiment, the segmentation pipeline application configures the at least one processor to refine the label predictions applied to individual 3D points using the graph neural network.

In another additional embodiment, the segmentation pipeline application configures the at least one processor to refine the label predictions applied to groups of 3D points using the graph neural network.

A method in accordance with an embodiment of the invention includes: performing a first training stage including optimizing a 3D Neural Network (3D NN) using a training data set including sets of 3D points with semantic annotations to obtain an optimized 3D NN; and performing a second training stage using the optimized 3D NN including optimizing over a joint framework including the optimized 3D NN and a graph neural network that outputs 3D point semantic labels using the training data set.

In a further embodiment, the first training stage includes forming voxels using each set of 3D points in the training data set, and the 3D NN is a three dimensional fully convolutional neural network (3D-FCNN).

In another embodiment, the 3D-FCNN further includes a layer that performs a trilinear interpolation.

In a still further embodiment, the trilinear interpolation of an initial label prediction for a given 3D point is based upon a weighted sum of the initial label predictions assigned to the eight nearest neighboring voxel centers to the given 3D point.

In still another embodiment, the weighted sum is based upon distance between the given 3D point and voxel centers.

In a yet further embodiment, the graph neural network is a Conditional Random Field (CRF).

In yet another embodiment, the second training stage includes jointly training the 3D-FCNN and CRF using the training data set.

A further embodiment again also includes performing geometric augmentation of the training data set.

In another embodiment again, performing geometric augmentation of the training data set includes at least one process selected from the group of: random rotation of each set of 3D data points in the training data set; random scaling of each set of 3D data points in the training data set; and jittering of the 3D coordinates of 3D data points within each set of 3D data points in the training data set.

Another further embodiment of the invention includes: at least one display device; at least one sensor system including a depth sensor and at least one camera; at least one processor; and a memory containing a segmentation pipeline application. In addition, the segmentation pipeline application configures the at least one processor to: capture sensor data using the at least one sensor system; generate a 3D point cloud of a scene based upon the captured sensor data;

pre-process the 3D point cloud to group 3D points into voxels; provide the voxels to a three dimensional fully convolutional neural network (3D-FCNN) to generate initial label predictions for the voxels; interpolate label predictions for individual 3D points based upon initial label predictions using trilinear interpolation; refine the label predictions using a Conditional Random Field (CRF); output a segmented 3D point based upon the label predictions; generate a 3D mesh using the segmented 3D point cloud; render the 3D mesh; and display the rendered 3D mesh via the at least one display device.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 5 shows Table 1, which presents results on the Semantic3D.net benchmark.

FIG. 7 shows Table 2, which presents results on the Large-Scale 3D Indoor Spaces Dataset.

FIG. 8 shows Table 3, which presents results on the NYUV2 dataset.

FIG. 9 shows Table 4, which presents results on the KITTI dataset.

FIG. 10 shows Table 5, which presents the effect of geometric augmentation of available training data.

FIG. 12 shows Table 6, which presents the effect of trilinear interpolation.

DETAILED DESCRIPTION

Figure 1:
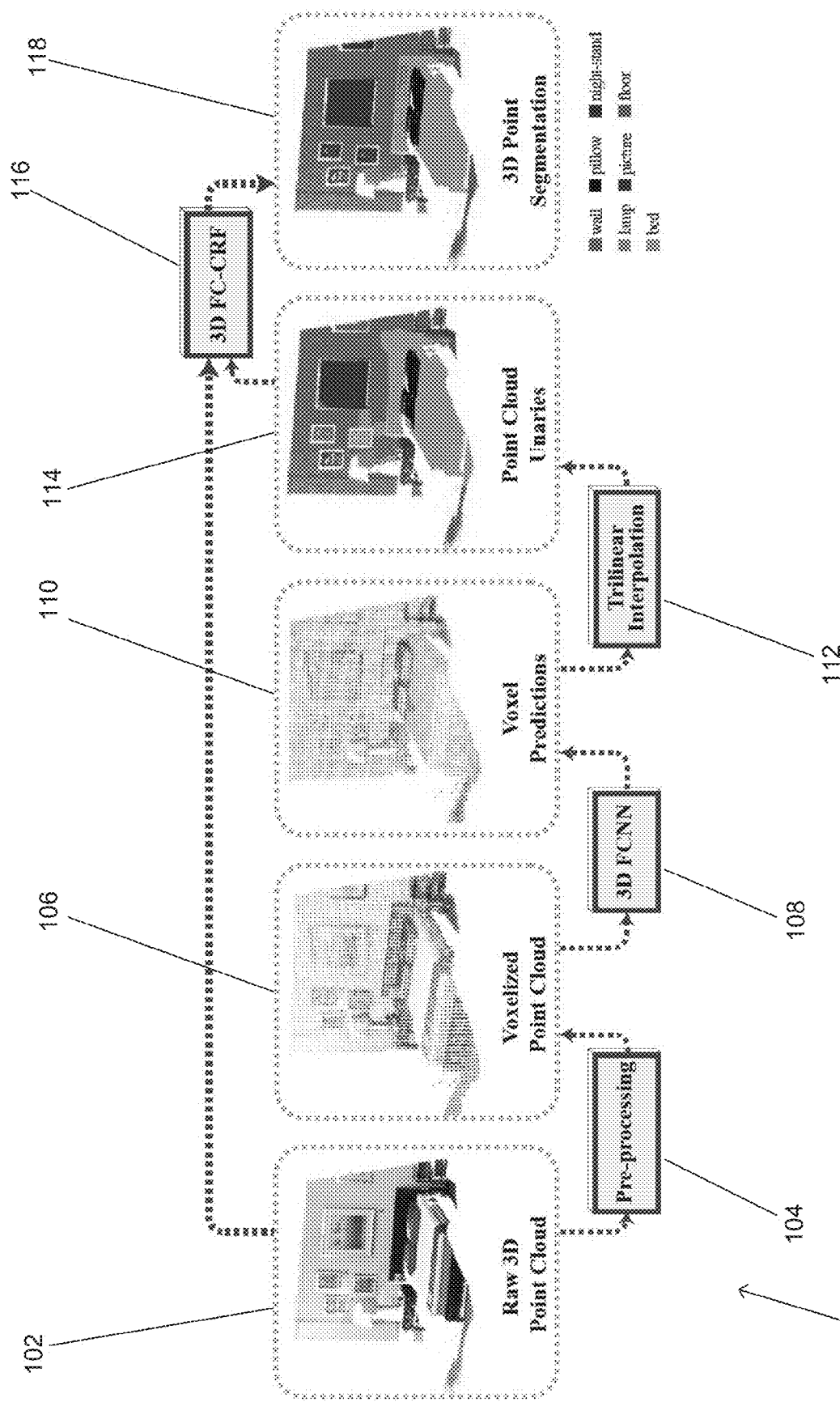
FIG. 1 conceptually illustrates a segmentation pipeline in accordance with an embodiment of the invention.

Turning now to the drawings, systems and methods in accordance with various embodiments of the invention include a segmentation pipeline for obtaining 3D point-level segmentation from 3D point clouds. In several embodiments, the segmentation pipeline combines the advantages of Neural Networks (NNs), 3D interpolation, and graph neural networks such as (but not limited to) fully connected Conditional Random Fields (FC-CRF). In a number of embodiments, coarse predictions from a NN such as (but not limited to) a 3D Fully Convolutional NN (3D-FCNN) are transferred to the raw 3D points via 3D interpolation such as (but not limited to) trilinear interpolation, and a graph neural network such as (but not limited to) FC-CRF. The graph neural network enforces local and global consistency of the labeling. In many embodiments, the graph neural network is implemented as a differentiable Recurrent NN to allow joint optimization.

Use of an end-to-end framework that leverages the advantages of 3D Neural Networks(3D-NN), 3D interpolation, and graph neural networks can enable fine-grained segmentation of 3D point cloud data. In detail, the 3D-NN provides class probabilities or features at a coarse level (such as (but not limited to) voxels), which can be transferred back to the raw 3D points using 3D interpolation. A graph neural network (such as FC-CRF) leveraging the transferred point features, can be utilized to infer 3D point labels in a manner that enforces spatial consistency. Transferring the coarse-level class probabilities or features to points before the graph neural network step, allows the graph neural network to use point level modalities (color, intensity, etc.) to learn a fine-grained labeling over the points, which can override the initial coarse 3D-NN predictions. The graph neural network can also be utilized to enforce local and global consistency of the coarse labeling before the 3D interpolation stage. Given that each stage of the segmentation pipeline is differentiable, the framework can be trained end-to-end using processes including (but not limited to) standard stochastic gradient descent.

3D-NNs are a strong candidate for the classifier stage in 3D point cloud segmentation. However, since they typically either require a regular grid as input or process groups of points, their predictions are limited to a coarse output (e.g. at the voxel (grid unit) level). The final segmentation is coarse since all 3D points within a voxel or point grouping are assigned the same semantic label, making the voxel or grouping size a factor limiting overall accuracy. In a number of embodiments, a fine-grained segmentation from a 3D-NN can be obtained through additional processing of the coarse 3D-NN output. In many embodiments, a segmentation pipeline is utilized that can leverage the coarse output of a 3D-NN and still provide a fine-grained labeling of 3D points using 3D interpolation and graph neural network. In several embodiments, the performance of the 3D-NN can be optimized by only processing non-empty groupings (such as voxels) which contain at least one point from the 3D point cloud. In other embodiments, alternative clustering or grouping techniques can be utilized that group 3D points from the 3D point cloud including (but not limited to) clusters of neighboring 3D points which are then processed by 3D-NNs. In certain embodiments, graph neural networks are utilized to process one or more graphs of features defined on individual 3D points or 3D point clusterings. As can readily be appreciated, the specific manner of clustering the 3D points and the construction of a NN to determine an initial estimate of the semantic labelings of the coarse groupings of points can be determined as appropriate to the requirements of a given application. Indeed, many embodiments of the invention utilize NNs that are applied to extract features from arbitrary subgroups of points (as opposed to regular voxels) such as (but not limited to) the PointNet NN architecture described in R. Q. Charles. H. Su, M. Kaichun and L. J. Guibas, "PointNet: Deep Learning on Point Sets for 3D Classification and Segmentation," 2017 IEEE Conference on Computer Vision and Pattern Recognition (CVPR), Honolulu, Hi., 2017, pp. 77-85, the disclosure of which is incorporated by reference herein in its entirety.

Systems and methods in accordance with various embodiments of the invention can handle 3D point clouds from various sources (laser scanners. RGB-D sensors, multiview stereo camera arrays, etc.). In addition, systems and methods in accordance with many embodiments of the invention can be utilized to perform 3D segmentation of sensor data captured of indoor and/or outdoor scenes, and/or with respect to 3D point clouds that partially or fully reconstruct 3D scenes. Systems and methods for semantic segmentation of 3D point clouds in accordance with a number of embodiments of the invention are discussed in further below.

Segmentation Pipeline

Segmentation pipelines in accordance with various embodiments of the invention group 3D points prior to processing by a 3D-NN. In a number of embodiments. 3D points are grouped into voxels, because a regular grid of voxels is amendable to processing via a 3D fully convolutional neural network (3D-FCNN). As can readily be appreciated, the specific 3D point grouping and 3D-NN utilized within a segmentation pipeline are largely dependent upon the requirements of a given application.

An overview of a segmentation pipeline in accordance with an embodiment of the invention is conceptually illustrated in FIG. 1. The segmentation pipeline 100 receives as its input a raw 3D point cloud 102. In a pre-processing stage 104 of the segmentation pipeline, the raw 3D point cloud data is voxelized and the resulting voxelized point cloud 106 is processed by a 3D-FCNN. In many embodiments, the point cloud is voxelized and represented as a 3D grid. In several embodiments, the voxelized point cloud is provided to a 3D-FCNN 108. As can readily be appreciated, the representation of the 3D point cloud data and the specific NN structure utilized to analyze the 3D point cloud data are largely dependent upon the requirements of a given application.

Referring again to the segmentation pipeline 100 shown in FIG. 1, the 3D-FCNN 108 down-samples the input volume and produces probability distributions or features over the set of classes (e.g. a set of objects or structures likely to be visible within a scene) for each down-sampled voxel, which can be referred to as voxel predictions or features 110. In a number of embodiments, a trilinear interpolation stage 112 interpolates class scores, probabilities, or features from down-sampled voxels 110 to 3D points 114. In a number of embodiments, inference is performed using a 3D FC-CRF 116, which combines the original 3D points 102 with interpolated class scores 114 to produce fine-grained class distributions over the point set that can be used to generate the final 3D point segmentation 118. As is discussed further below, the entire segmentation pipeline can be jointly optimized.

While a specific segmentation pipeline is illustrated in FIG. 1, any of a variety of processing pipelines can be implemented as appropriate to the requirements of a given application in accordance with various embodiments of the invention. In a number of embodiments, alternative NN structures can be utilized including (but not limited to) NN structures that convolve alternative structures (e.g. clusters of 3D points, or graphs) and/or NN structures that accept 3D points as inputs. Various segmentation pipelines that utilized 3D-FCNNs in accordance with a number of embodiments of the invention are discussed below.

3D Fully Convolutional Neural Network

Segmentation pipelines in accordance with several embodiments of the invention can use a 3D-FCNN that is able to learn an optimal representation for this task by training against data sets annotated by ground truth labels. Use of a fully convolutional network can reduce the computational overhead of generating predictions for each voxel by sharing computations.

Given that input to a 3D-FCNN are often in the form of a voxel grid, segmentation pipelines in accordance with a number of embodiments of the invention convert 3D point clouds as follows. Each data point is a 3D observation $o_i$, that includes the 3D position $p_i$ and other available modalities, such as the color intensity $I_i$ and sensor intensity $S_i$. The 3D observations $O=\{o_i\}_i$ can be placed in a metric space so that the convolution kernels can learn the scale of objects. This process is usually handled in most 3D sensors. A regular 3D grid can be defined that encompasses the 3D observations. Each cell in the 3D grid can be denoted as a voxel $v_i$. In an illustrative example, each cell can be a cube with length V=5 cm. As can readily be appreciated, any cell size (or shape) can be utilized as appropriate to the requirements of a given application. Most of the space in the 3D input is empty and has no associated features. To characterize this, a channel can be utilized to denote the occupancy as a zero or one value. Additional channels can also be utilized to represent other modalities. For instance, three channels can be used for color, and one channel can be used for sensor intensity when available. As can readily be appreciated, the number of channels utilized to represent data within the segmentation pipeline is largely dependent upon the requirements of a given application.

Figure 2:
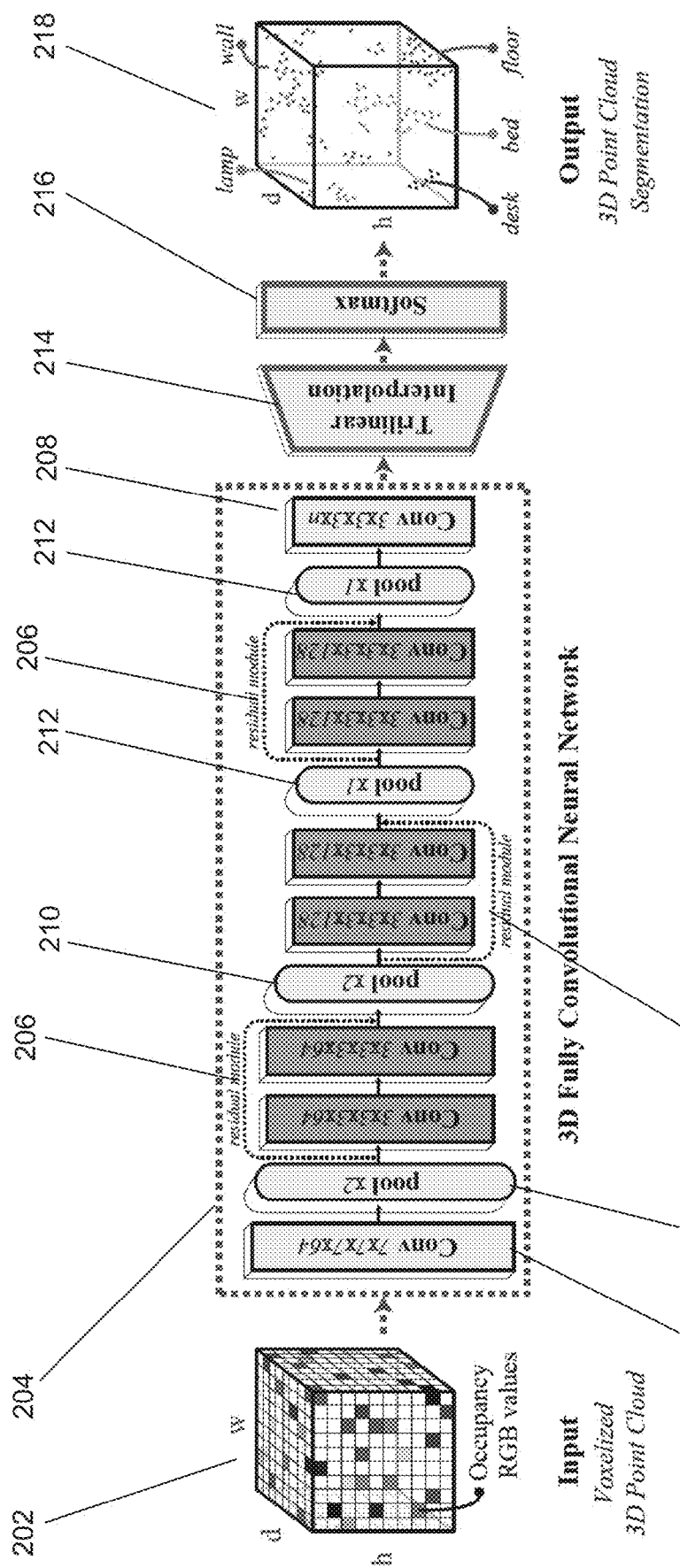
FIG. 2 conceptually illustrates a segmentation pipeline implemented using a 3D Fully Convolutional Neural Network (3D-FCNN), a trilinear interpolation layer and a graph neural network in accordance with an embodiment of the invention.

A 3D-FCNN that can be utilized within a segmentation pipeline in accordance with an embodiment of the invention is illustrated in FIG. 2. The segmentation pipeline 200 accepts as an input a voxelized 3D point cloud 202, which is provided to a 3D-FCNN 204. In the illustrated embodiment, the 3D-FCNN incorporates three residual modules 206 sandwiched between two convolutional layers 208, as well as two destructive pooling layers 210 in the early stages of the architecture to down-sample the grid, and two non-destructive pooling layers 212 towards the end. The early down-sampling enables the segmentation pipeline to execute with a smaller memory footprint than the amount of memory that would be required without down-sampling. The entire framework is fully convolutional and can handle arbitrarily sized inputs. For each voxel $v_i$, the 3D-FCNN predicts a probability distribution $q_i$ over labels. The resulting distributions are transferred to the raw 3D points via trilinear interpolation 214.

3D Trilinear Interpolation

The process of voxelization and subsequent down-sampling in a 3D-FCNN results in an output representation that is a coarse 3D grid, which limits the resolution of semantic labeling at the FC-CRF stage. Running a FC-CRF on such coarse voxels results in a coarse segmentation. One option to avoid this information loss is to increase the resolution of the voxel grid (i.e. decrease the voxel size) and/or remove the destructive pooling layers, and run the FC-CRF directly on the fine-grained voxels. However, this quickly runs into computational and memory constraints, since for given 3D data dimensions, the memory requirement of the 3D-FCNN grows cubically with the resolution of the grid. Also, for a given 3D-FCNN architecture, the receptive field decreases as the resolution of the grid increases, which can reduce performance due to having less context available during inference.

Figure 3:
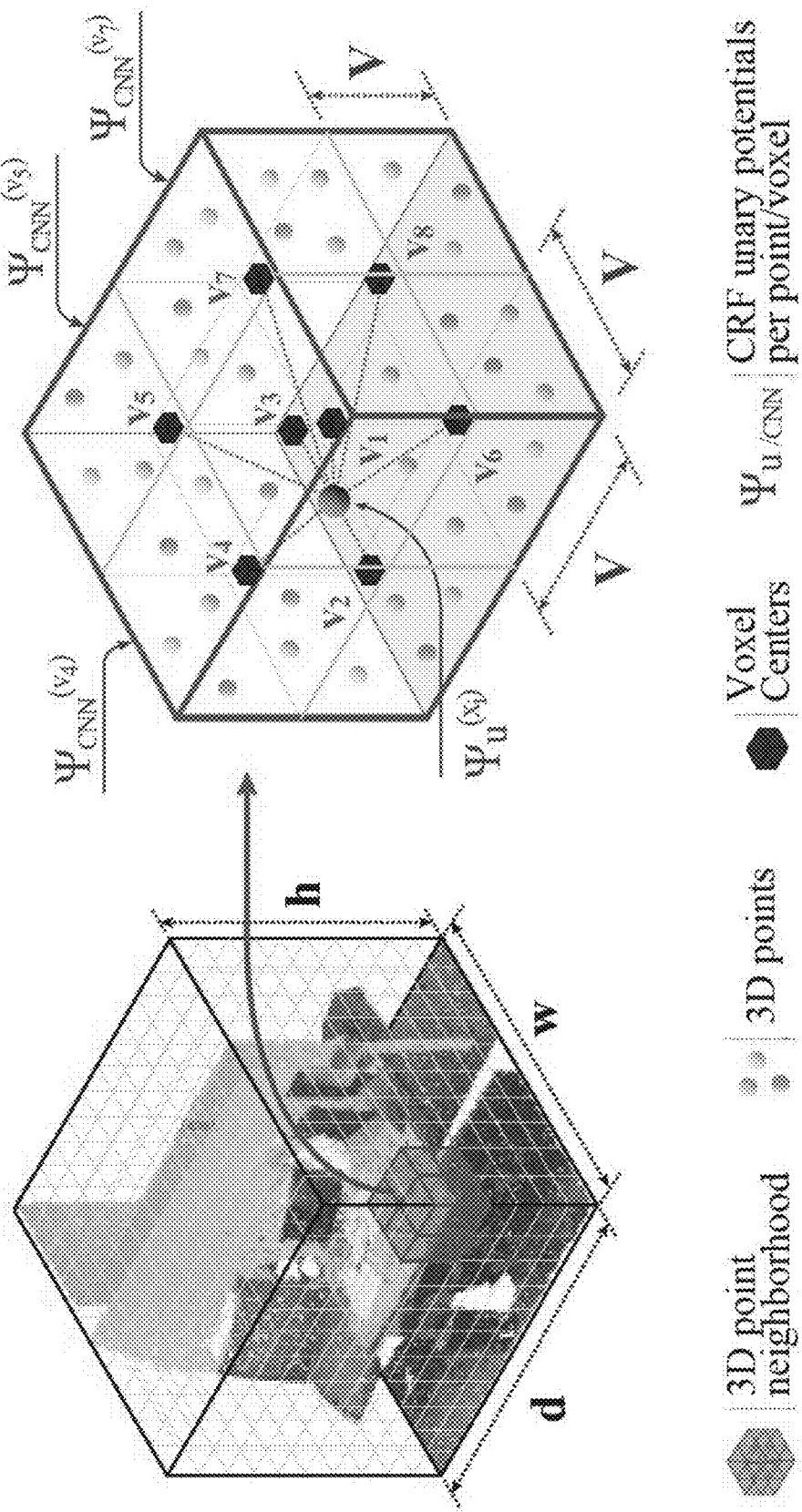
FIG. 3 conceptually illustrates trilinear interpolation of class scores from voxels to points in accordance with an embodiment of the invention.

Instead of using a voxel-based CRF approach, segmentation pipelines in accordance with many embodiments of the invention perform 3D-FCNN inference using the raw 3D points as nodes. In this way, the CRF can leverage both the 3D-FCNN output and the fine-grained modalities of the input 3D points to generate accurate predictions that capture scene and object boundaries in detail. In several embodiments, trilinear interpolation is utilized to transfer the voxel-level predictions from the 3D-FCNN to the raw 3D points as illustrated in FIG. 3. In the illustrated embodiment, each point's score is computed as the weighted sum of the scores from its 8 spatially closest voxel centers. Specifically, for each point, $o_i = \{p_i, I_i, S_i\}$, a random variable $x_i$ is defined that denotes the semantic class and the scores(logits) $L_i$ associated with the distribution of $x_i$ are defined as a weighted sum of scores $L_{i,n}(x_{i,n})$ of its 8 spatially closest voxels $v_{i,n}$, $n \in \{1, \ldots, 8\}$ whose centers are $(p_{i,n}^x, p_{i,n}^y, p_{i,n}^z)$ as follows:

$$\psi_u(x_i = l) = L_i(x_i = l) = \sum_{n=1}^{8} w_{i,n} L_{i,n}(x_{i,n} = l) \quad (1)$$

$$w_{i,n} = \prod_{s \in \{x,y,z\}} (1 - |p_i^s - p_{i,n}^s| / V)$$

where V is the voxel size. During back propagation, we use the same trilinear interpolation weights $w_{i,n}$ to splat the gradients from the FC-CRF to the 3D-FCNN. The obtained point level scores are then used as unaries in the CRF.

3D Fully Connected Conditional Random Field

The energy function of a FC-CRF includes a set of unary and pairwise potential energy terms. The unary potentials can provide an initial probability distribution across semantic classes and the pairwise potential can provide smoothness and consistency between predictions. The energy of the FC-CRF can be defined as, $$E(x) = \sum_i \psi_u(x_i) + \sum_{i<j} \psi_p(x_i, x_j) \quad (2)$$

where $\psi_u$ denotes the unary potential which is defined in Equation
and $\psi_p$ denotes the pairwise potential. Note that all nodes in the FC-CRF are connected with each other through the pairwise potentials. In many embodiments. Gaussian kernels are used for the pairwise potentials, $$\psi_p(x_i, x_j) = \quad (3)$$
$$\mu(x_i, x_j) \left[ w_s \exp\left(-\frac{|p_i - p_j|^2}{2\theta_\gamma^2}\right) + w_b \exp\left(-\frac{|p_i - p_j|^2}{2\theta_\alpha^2} - \frac{|I_i - I_j|^2}{2\theta_\beta^2}\right) \right]$$

where $w_b$ and $w_s$ are the weights of the bilateral and spatial kernel respectively, $\mu$ is the label compatibility score, and $\theta_\alpha$, $\theta_\beta$, $\theta_\gamma$ are the kernels' bandwidth parameters. When RGB information is not available, a segmentation pipeline can be utilized that only uses the spatial kernel. Using Gaussian kernels can enable fast variational inference and learning through a series of convolutions on a permutohedral lattice.

CRF Inference and Joint Optimization

Exact energy minimization in a FC-CRF is generally considered to be intractable. In many embodiments, a variational inference method is utilized which allows joint optimization of both the FC-CRF and the 3D-FCNN. Examples of appropriate variational inference methods that can be utilized in accordance with many embodiments of the invention are disclosed in R. Zhang, S. A. Candra, K. Vetter, and A. Zakhor, "Sensor fusion for semantic segmentation of urban scenes." 2015 IEEE International Conference on Robotics and Automation (ICRA), pages 18501857, 2015 and P. Krahenbuhl and V. Koltun, "Efficient inference in fully connected crfs with gaussian edge potentials." In J. Shawe-Taylor, R. S. Zemel, P. L. Bartlett, F. Pereira, and K. Q. Weinberger, editors, Advances in Neural Information Processing Systems 24, 2011, the disclosures of which including relevant disclosures related to variational inference methods are incorporated by reference herein in their entirety. The output after the FC-CRF energy minimization gives fine-grained predictions for each 3D point that takes smoothness and consistency into account. Given the final output of the FC-CRF, the distance between the prediction and ground truth semantic labels can be used as a loss function which is minimized.

FC-CRF Inference

A FC-CRF with Gaussian potential has a special structure that can allow for fast and efficient inference. An approximate inference method can be utilized, which assumes independence between semantic label distributions $Q(X) = \Pi_i Q_i(x_i)$, having the following update equation:

$$Q_i^+(x_i = l) = \quad (4)$$
$$\frac{1}{Z_i} \exp\left\{-\psi_u(x_i) - \sum_{l' \in \mathcal{L}} \mu(l, l') \sum_{m=1}^{K} w^{(m)} \sum_{j \neq i} k^{(m)}(f_i, f_j) Q_j(l')\right\}$$

The above update equation can be implemented using simple convolutions, sums and softmax. In many embodiments, CRF inference and learning is as a Recurrent Neural Network (CRF-RNN). A CRF-RNN can be trained within a standard CNN framework. Therefore, implementing the FC-CRF as a CRF-RNN in combination with a 3D-FCNN provides a segmentation pipeline in which joint training can be applied to both NNs.

Loss

Once the energy of the FC-CRF is minimized in Equation 2, a final prediction distribution of the semantic class $x_i$ on each 3D observation $o_i$ is obtained. Denoting the ground truth discrete label of the observation $o_i$ as $y_i$, the loss function can be defined as the distance between a final prediction distribution and the ground truth distribution using KL divergence:

$$L(x, y) = \frac{1}{N} \sum_i^N E_{y_i}[-\log p(x_i)] \quad (5)$$

where N is the number of observations. Since the entropy of $y_i$ is a constant with respect to all parameters, it does not need to be included in the loss function equation.

Joint Training

Figure 4:
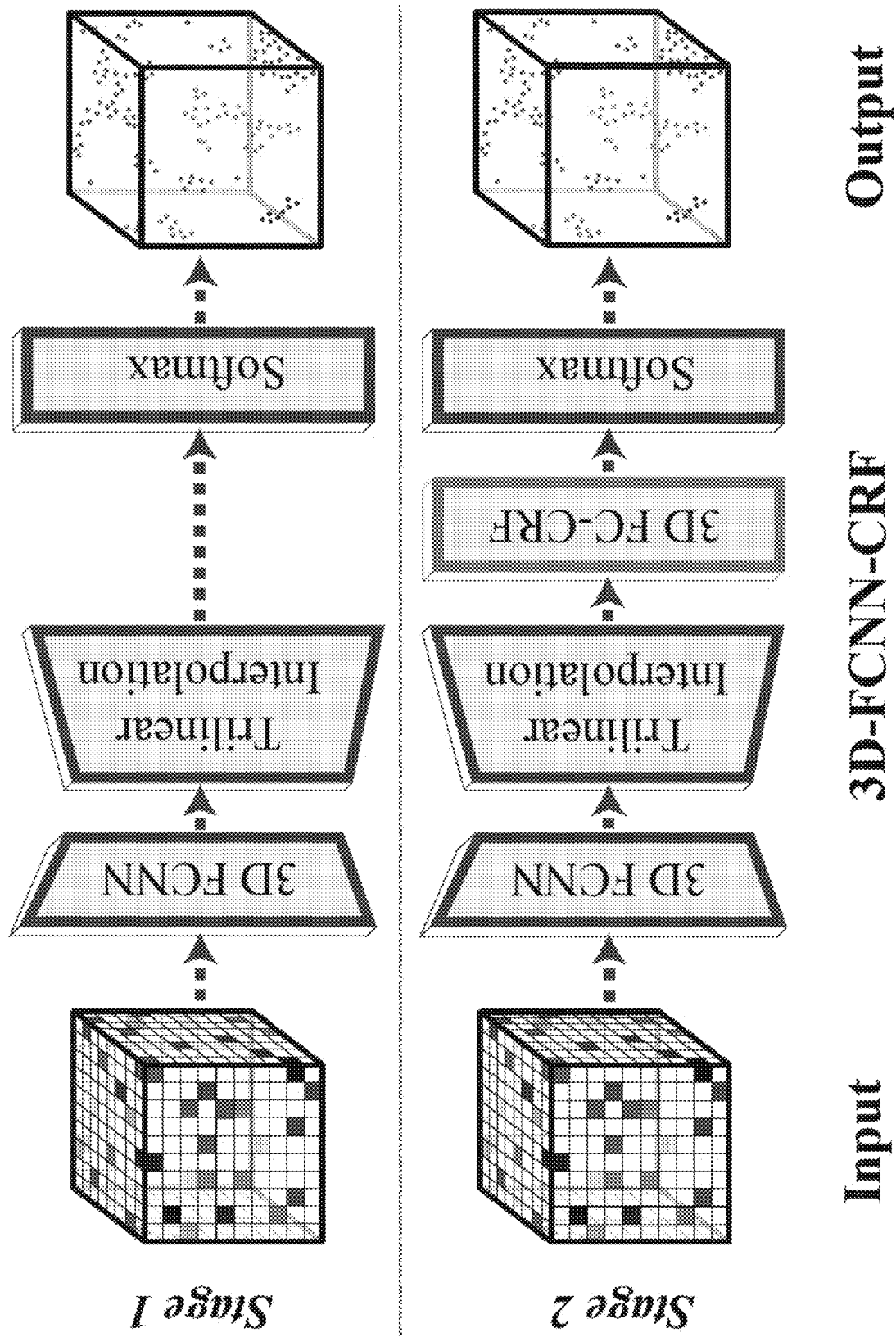
FIG. 4 conceptually illustrates a 2-stage training process including first optimizing over point-level unary potentials and then over a joint framework for point-level fine-grained labeling in accordance with an embodiment of the invention.

In a number of embodiments, training is performed in a 2-step process conceptually illustrated in FIG. 4. The process illustrated in FIG. 4 involves a 2-stage training by first optimizing over the point-level unary potentials (no CRF) and then over the joint framework for point-level fine-grained labeling. In the first stage, the 3D-FCNN is trained in isolation via trilinear interpolation for a number of epochs (e.g. 200). In the second stage, the 3D-FCNN and the FC-CRF are trained end-to-end (both modules connected through the trilinear interpolation layer). The approximate variational inference method used for the FC-CRF approximates convolution in a permutohedral grid whose size depends on the bandwidth parameters $\theta_\alpha$, $\theta_\beta$, $\theta_\gamma$. In several embodiments, $\theta_\gamma$ is fixed at a given value (e.g. 5 cm), $\theta_\beta$ at a second value (e.g. 11 cm) and a grid search is used with small perturbation on a validation set to find the optimal $\theta_\alpha$.

In a number of embodiments, the first training stage utilizes a trilinear interpolation layer to map the voxel-wise predictions to point-wise predictions and minimize the point-wise loss. A 3D-FCNN with a Trilinear Interpolation layer can be trained for 200 epochs with a learning rate between 1e-5 and 1e-3, which can be reduced by a factor of 10 every 50 epochs. In a second training stage, the pre-trained 3D-FCNN, the trilinear interpolation layer and a CRF can be combined and trained end-to-end. The base learning rate in this stage can be set to a value between 1e-7 and 1e-5, and the training performed for 2 epochs. In many embodiments a learning rate multiplier of 1e4 and 1e3 for the CRF's bilateral weights and compatibility matrix can be used. In most cases, the training of the second stage converges within a few hundred iterations (convergence can be determined using a validation set). In the CRF formulation, although the kernel weights $w_a$, $w_b$ and the compatibility matrix are learned using gradient descent, the kernel bandwidth parameters $\theta_\alpha$, $\theta_\beta$, $\theta_\gamma$ are not learned within the efficient variational inference framework. Thus, a grid search or fixed values can be used for some parameters. In a number of embodiments, the training process fixes $\theta_\gamma$ at 5 cm, $\theta_\beta$ at 11, and use a validation set to search for an optimal value of $\theta_\alpha$. The search can be limited to the range [0.1; 3.2]m. When no RGB information is available, a search for $\theta_\gamma$ can be performed in the same range without using the bilateral filter. The kernel weights and compatibility matrix can be learned during training. In a number of embodiments, 5 CRF iterations are utilized during training and 10 CRF iterations are utilized at test time. As can readily be appreciated, various parameters including (but not limited to) learning rate, kernel weights, kernel bandwidth parameters, and number of iterations utilized during training can be determined as appropriate to the requirements of a given application in accordance with various embodiments of the invention. Performance of segmentation pipelines trained in accordance with certain embodiments of the invention are discussed below.

System Performance

Performance of a segmentation pipeline implemented in accordance with an embodiment of the invention can be evaluated with respect to various 3D datasets.

Datasets

Several 3D scene datasets have been made available to the research community. Four exemplary datasets are discussed herein that include 3D point cloud data obtained with respect to a variety of use cases including indoor and outdoor, partial and fully reconstructed, as well as small, medium and large scale point clouds. The datasets are the Semantic3D.net Benchmark described in Hackel, Timo, et al. "Semantic3D. net: A new large-scale point cloud classification benchmark." arXiv preprint arXiv:1704.03847 (2017), the Stanford Large-Scale 3D Indoor Spaces Dataset (S3DIS) described in Armeni. Iro. et al. "3d semantic parsing of large-scale indoor spaces." Proceedings of the IEEE Conference on Computer Vision and Pattern Recognition. 2016, the KITTI dataset described in Geiger. Andreas, et al. "Vision meets robotics: The KITTI dataset." The International Journal of Robotics Research 32.11 (2013): 1231-1237, and the NYU V2 dataset described in Silberman, Nathan, et al. "Indoor segmentation and support inference from rgbd images." European Conference on Computer Vision, Springer, Berlin, Heidelberg, 2012. The disclosure of the above referenced papers and specifically regarding each of the datasets is hereby incorporated by reference in its entirety. The datasets showcase a wide range of sizes from the smallest KITTI dataset with about 12 million points, to the largest Semantic3D.net with about 1.9 billion points. The following discussion evaluates the performance of segmentation pipelines in accordance with a number of embodiments of the invention with respect to each dataset.

Results

Quantitative and qualitative results are presented below with respect to each of the datasets introduced above. A comparison is performed against the state-of-the-art, and an ablation study is performed to showcase the benefits of use of segmentation pipelines in accordance with various embodiments of the invention that incorporate a FC-CRF. The metrics reported are mean IOU and mean accuracy across classes unless otherwise stated.

Figure 6:
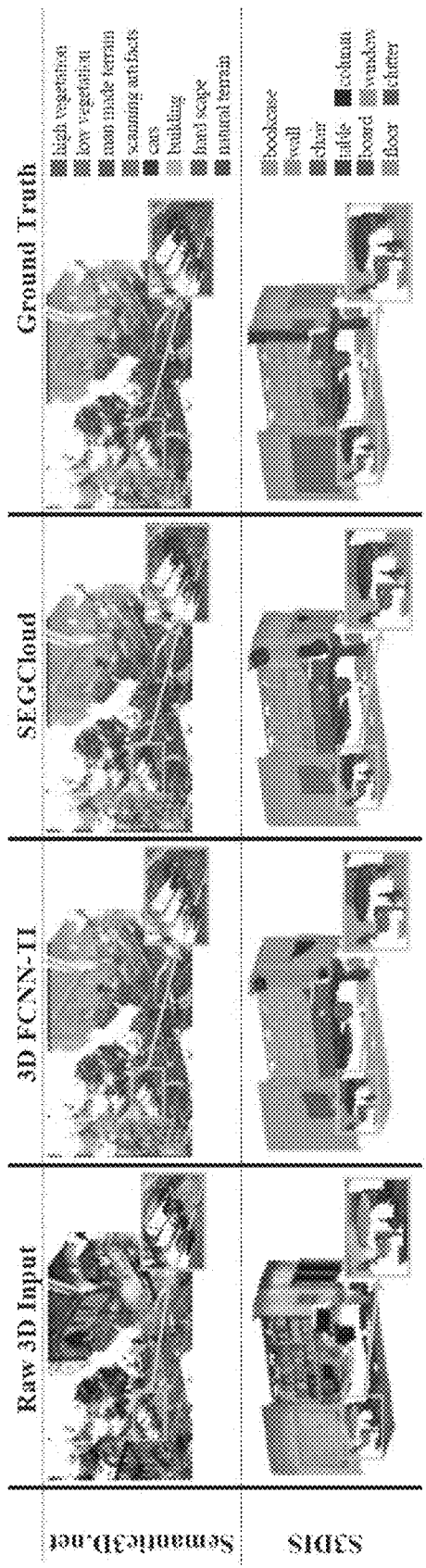
FIG. 6 illustrates qualitative results obtained by application of a segmentation pipeline implemented in accordance with an embodiment of the invention with respect to Semantic3D.net and S3DIS data sets.

Semantic3D.net Benchmark:

A segmentation pipeline in accordance with an embodiment of the invention is evaluated on the recent Semantic3D.net benchmark, which is currently one of the largest labeled 3D point cloud datasets for outdoor scenes. It contains over 3 billion points and covers a range of urban scenes. Results are provided on the reduced-8 challenge of the benchmark in FIG. 5. The segmentation pipeline outperforms the system described in Boulch, Alexandre, Bertrand Le Saux, and Nicolas Audebert. "Unstructured Point Cloud Semantic Labeling Using Deep Segmentation Networks." 3DOR, 2017 by 2.2 mIOU points and 2.28% accuracy and sets a new state-of-the-art on that challenge. When compared against the best method that does not leverage extra data through ImageNet pretrained networks, the segmentation pipeline outperforms the system described in Hackel, Timo, Jan D. Wegner, and Konrad Schindler. "FAST SEMANTIC SEGMENTATION OF 3D POINT CLOUDS WITH STRONGLY VARYING DENSITY." ISPRS Annals of Photogrammetry. Remote Sensing Spatial Information Sciences 3.3 (2016) by 7.1 mIOU points, 4.1% accuracy. Note that the segmentation pipeline utilized to obtain the results also does not leverage extra data or ImageNet pretrained networks. The base 3D-FCNN trained with Trilinear Interpolation (3D-FCNN-TI) already achieves state-of-the-art performance, and an additional improvement of 3.1 mIOU points and 3.22% can be attributed to the FC-CRF. An example segmentation produced by a segmentation process in accordance with an embodiment of the invention is shown in FIG. 6. The 3D-FCNN-TI produces a segmentation which contains some noise on the cars highlighted in the figure. However, combination with the FC-CRF is able to remove the noise and provide a cleaner segmentation of the point cloud.

Stanford Large-Scale 3D Indoor Spaces Dataset (S3DIS):

The S3DIS dataset provides 3D point clouds for six fully reconstructed large-scale areas, originating from three different buildings. In order to evaluate the performance of a segmentation pipeline in accordance with an embodiment of the invention, an end-to-end pipeline was trained on two of the buildings and tested on the third. The performance of the segmentation pipeline was compared against the MLP architecture of Qi et al. (PointNet) referenced above to perform a six-fold cross validation across areas rather than buildings. However, with this experimental setup, areas from the same building end up in both the training and test set resulting in increased performance and do not measure generalizability. For a more principled evaluation, the test set was chosen to match the fifth fold described by Qi et al. (ie. testing was performed with respect to Area 5 and training on the rest). A comparison is shown in the table shown in FIG. 7 The segmentation pipeline outperforms the MLP architecture by 7.83 mIOU points and 8.37% in mean accuracy. The base 3D-FCNN-TI also outperforms the MLP architecture and the effect of the segmentation pipeline's design choices on the performance of the 3D-FCNN and 3D-FCNN-TI are analyzed below. Qualitative results on this dataset as illustrated in FIG. 6 show an example of how detailed boundaries are captured and refined utilizing segmentation pipelines in accordance with various embodiments of the invention.

NYU V2:

The NYU V2 dataset contains 1149 labeled RGB-D images. Camera parameters are available and are used to obtain a 3D point cloud for each RGB-D frame. In robotics and navigation applications, agents typically do not have access to fully reconstructed scenes and labeling single frame 3D point clouds can be invaluable. A comparison is performed against 2D and 3D-based methods except for those that leverage additional large scale image datasets (e.g. the systems described in Kim, Byung-soo, Pushmeet Kohli, and Silvio Savarese, "3D scene understanding by voxel-CRF." Proceedings of the IEEE International Conference on Computer Vision, 2013, and Eigen, David, and Rob Fergus. "Predicting depth, surface normals and semantic labels with a common multi-scale convolutional architecture." Proceedings of the IEEE International Conference on Computer Vision, 2015), or do not use the official split or the 13-class labeling defined in Couprie, Camille, et al. "Indoor semantic segmentation using depth information." arXiv preprint arXiv:1301.3572 (2013). (e.g. the systems described by Kim et al. referenced above, or in Wolf, Daniel, Johann Prankl, and Markus Vincze. "Fast semantic segmentation of 3D point clouds using a dense CRF with learned parameters." Robotics and Automation (ICRA), 2015 IEEE International Conference on. IEEE, 2015). A confusion matrix is obtained for the highest performing method described in Wolf, Daniel, Johann Prankl, and Markus Vincze. "Enhancing semantic segmentation for robotics: The power of 3-d entangled forests." IEEE Robotics and Automation Letters 1.1 (2016): 49-56 to compute mean IOU in addition to the mean accuracy numbers they report. Wolf et al. evaluate their method by aggregating results of 10 random forests. Similarly, the segmentation pipeline implemented in accordance with an embodiment of the invention uses 10 different random initializations of network weights, and uses a validation set to select a final trained model for evaluation. Results are shown in Table 3 in FIG. 8. The segmentation pipeline implemented in accordance with an embodiment of the invention outperforms the 3D Entangled Forests method of Wolf et al. by 3.94 mIOU points and 0.83% mean accuracy.

KITTI:

The KITTI dataset provides six hours of traffic recording using various sensors including a 3D laser scanner. Zhang et al. annotated a subset of the KITTI tracking dataset with 3D point cloud and corresponding 2D image annotations for use in sensor fusion for 2D semantic segmentation. As part of their sensor fusion process, they train a unimodal 3D point cloud classifier using Random Forests (see Zhang, Richard, et al. "Sensor fusion for semantic segmentation of urban scenes." Robotics and Automation (ICRA), 2015 IEEE International Conference on. IEEE, 2015). This classifier can be used as a baseline for evaluating the performance of a segmentation pipeline implemented in accordance with an embodiment of the invention. The comparison on the labeled KITTI subset is reported in Table 4 in FIG. 9. The results demonstrate performance on par with the system described by Zhang et al. where a Random Forests classifier is used for segmentation. Note that for this dataset, the segmentation pipeline is trained on the laser point cloud with no RGB information.

Analysis of Results:

In all datasets presented, the performance of segmentation pipelines trained in accordance with various embodiments of the invention is on par with or better than the previous methods used as sources of comparison. As expected, the addition of a FC-CRF improves the 3D-FCNN-TI output and the qualitative results showcase the ability of the FC-CRF to recover clear object boundaries by smoothing out incorrect regions in the bilateral space (e.g. cars in Semantic3D.net or chairs in S3DIS). Quantitatively, the addition of the FC-CRF offers a relative improvement of 3.0-5.3% mIOU and 4.4-4.7% mAcc for all datasets. Specifically, the largest relative improvement can be observed on Semantic3D.net—5.3% mIOU. Since Semantic3D.net is by far the largest dataset (at least 8 times larger), the results suggests that, when large scale datasets are used as the base networks, the resulting semantic pipelines are less prone to overfitting. It can be observed, however, that several classes in the S3DIS dataset, such as board, column and beam are often incorrectly classified as walls. These elements are often found in close proximity to walls and have similar colors, which can present a challenge to both the 3D-FCNN-TI and the FC-CRF.

System Analysis

Two additional components of segmentation pipelines in accordance with many embodiments of the invention can be analyzed: geometric data augmentation and trilinear interpolation. Experiments can be performed using the S3DIS dataset to analyze the effect of joint training versus separate CRF initialization.

Effect of Geometric Data Augmentation:

Segmentation pipelines in accordance with many embodiments of the invention can use any of several types of data augmentation as appropriate to the requirements of a given application. In several embodiments, non-standard geometric data augmentation methods can be utilized including but not limited to random 360° rotation along the z-axis and scaling. In many embodiments, alternative forms of augmentation can be utilized, including (but not limited to) random rotation along the z-axis, and jittering of x,y,z coordinates to augment object 3D point clouds. The role of geometric augmentation methods on the performance of a 3D-FCNN-TI can be evaluated by training the 3D-FCNN-TI without any geometric augmentation and comparing the performance to a 3D-FCNN-TI trained using geometrically augmented data. A comparison of the results is presented in Table 5 shown in FIG. 10. It can be observed that geometric augmentation can play a significant role in the final performance of a segmentation pipeline and is responsible for an improvement of 3.79 mIOU points. However, even without any geometric augmentation, the 3D-FCNN-TI outperforms the MLP architecture of Qi et al. by 2.58 mIOU points.

Figure 11:
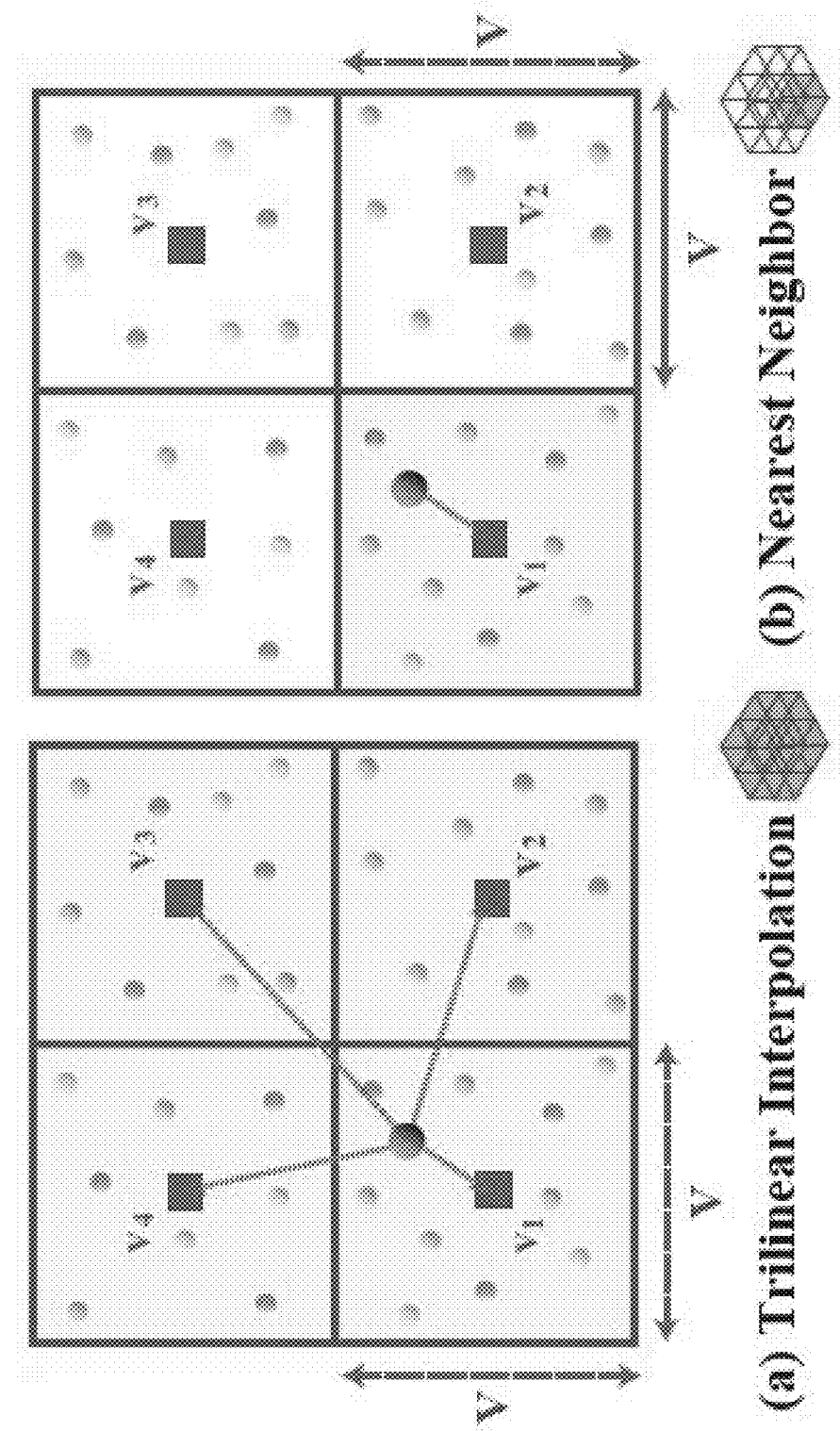
FIG. 11 conceptually illustrates a simplified 2D view of the assignment of voxel labels to 3D points using trilinear interpolation in accordance with an embodiment of the invention.

Trilinear Interpolation Analysis:

The effect of trilinear interpolation on the performance of segmentation pipelines in accordance with various embodiments of the invention can also be evaluated. For simplicity, the analysis can be performed on the combination of a 3D-FCNN and interpolation layer only (i.e. no CRF module). In this way, the advantage of a 8-neighbours trilinear interpolation scheme over simply assigning labels of points according to the voxel to which they belong can be studied (see FIG. 11 for a simplified 2D schematic explanation of the two methods). The results of the two interpolation schemes are presented in Table 6 shown in FIG. 12. It can be observed that trilinear interpolation can improve 3D-FCNN performance by 2.62 mIOU points over simply transferring the voxel label to the points within the voxel. This shows that considering the metric distance between points and voxels, as well as a larger neighborhood of voxels can help improve accuracy in predictions. While trilinear interpolation is discussed extensively above, it can be readily appreciated that alternative interpolation schemes including interpolation processes that consider metric distance between points and/or voxels can be used as appropriate to the requirements of specific applications in accordance with various embodiments of the invention.

Systems for Performing Semantic Segmentation

Systems and methods in accordance with various embodiments of the invention can be implemented on a variety of computing platforms. As noted above, semantic segmentation can be useful in a variety of robotics, mixed reality, augmented reality, and virtual reality applications. In many embodiments, a semantic segmentation pipeline is implemented in a cloud computing environment as a service that can be utilized via a variety of client applications to obtain semantic labelings of 3D points clouds. As can readily be appreciated, the specific sensors utilized to acquired a 3D point cloud and/or the computing system utilized to implement a semantic segmentation pipeline to process the 3D point cloud are typically dependent upon the requirements of a given application.

Figure 13:
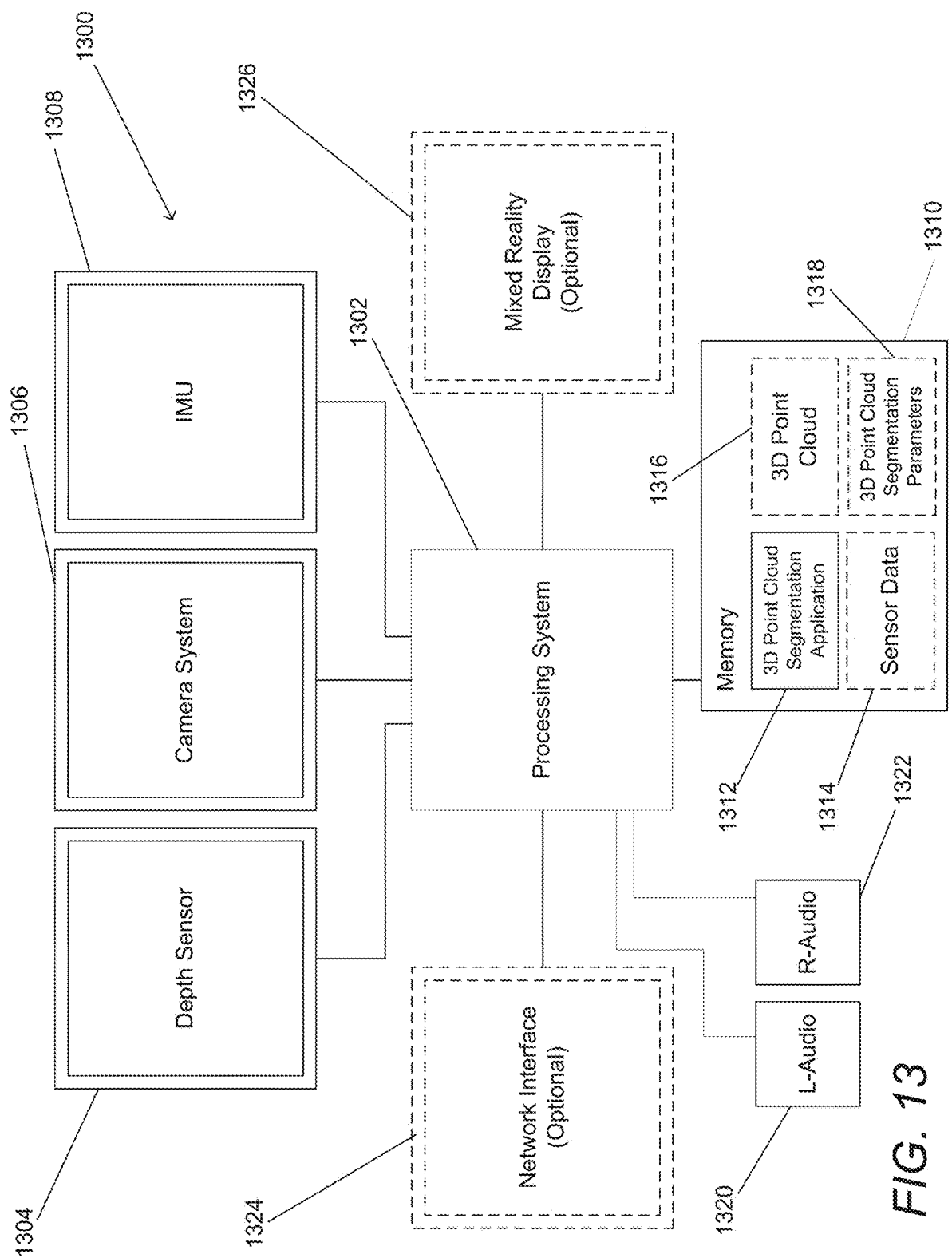
FIG. 13 conceptually illustrates a computing system that implements a segmentation pipeline for performing semantic segmentation of 3D point clouds generated from sensor data captured by the computing system in accordance with an embodiment of the invention.

A system for acquiring 3D point clouds and performing semantic segmentation of the 3D point clouds in accordance with an embodiment of the invention is illustrated in FIG. 13. The system 1300 includes a processing system 1302 configured to process sensor data received from an array of sensors. The processing system or processor 1302 can be implemented using one or more microprocessors, graphics processing units, image signal processors, machine vision processors, and/or custom integrated circuits developed in order to implement the system 1300. In the illustrated embodiment, the sensors include a depth sensor 1304, a camera system 1306, and an inertial measurement unit 1308. While specific sensor systems are described below, any of a variety of sensors can be utilized to perform localization, determine pose of a user (e.g. determine head position and orientation), and/or capture a 3D point cloud of a scene as appropriate to the requirements of a given application.

Referring again to FIG. 13, the depth sensor 1304 can take the form of one or more stereo camera pairs (optionally enhanced by projected texture), a structured illumination system and/or a time of flight camera. In certain embodiments, the depth sensor 1304 can be a LIDAR system. As can readily be appreciated, any of a variety of depth sensor systems can be utilized as appropriate to the requirements of a given application in accordance with various embodiments of the invention.

In many embodiments, the camera system 1306 includes a single RGB camera. In several embodiments, the camera system includes multiple cameras with different color filters and/or fields of view. In certain embodiments, the camera system includes an RGB camera with a narrow field of view and a monochrome camera with a wide field of view. Color information can assist with performing detection of elements such as (but not limited to) people, objects and/or structures within a scene. Wide field of view image data can be utilized to perform motion tracking. As can be readily appreciated, the need for a camera system and/or specific cameras included in a camera system utilized within a system in accordance with an embodiment of the invention is typically dependent upon the requirements of a given application.

In the illustrated embodiment, the system 1300 includes an inertial measurement unit (IMU) 1308 that can provide information concerning the motion of the system. As can readily be appreciated, information generated by the sensors within the IMU can be utilized by the processing system 1302 to perform SLAM processes.

The processing system 1302 is configured by software stored within the memory 1310 of the system. In the illustrated embodiment, a 3D point cloud segmentation application 1312 coordinates capture of sensor data 1314 using the sensor systems. The sensor data 1314 is stored in memory 1310 and processed by the processing system 1302 to generate an initial 3D point cloud 1316. As can readily be appreciated, another application can coordinate capture of sensor data and construction of a 3D point cloud 1316 and the 3D point cloud segmentation application 1312 can receive the 3D point cloud 1316 as an input as appropriate to the requirements of a given application.

The 3D point cloud 1316 can be described by data structures stored in the memory 1310 of the system 1300. In many embodiments, these data structures are dynamic and are continuously updated as the system explores a specific environment. In many embodiments, the 3D point cloud is utilized to generate a 3D mesh that can be represented using any of a variety of data structures that are commonly utilized to represent 3D meshes within the memory of a computer system. As is discussed further below, the 3D point cloud segmentation application 1312 can be utilized to apply semantic labels to 3D points within the 3D point cloud and these can be transferred to a mesh representation generated using the 3D point cloud. In several embodiments, the 3D mesh is utilized to generate a 3D spatial model that describes the real-world environment annotated using semantic labels generated in accordance with an embodiment of the invention.

In many embodiments, the 3D point cloud segmentation application 1312 implements a semantic segmentation pipeline similar to the various segmentation pipelines described above. In several embodiments, the semantic segmentation pipeline is utilized to label specific 3D points as belonging to any of a variety of different classes including (but not limited to) people, objects, and/or structures within the scenes captured by the sensor systems. In many embodiments, sensor data captured by multiple modalities (e.g. depth and image data) are utilized by the semantic segmentation pipeline. When a 3D point is labelled as forming part of a person, object, and/or structure by the semantic segmentation pipeline, the processing system 1302 can instantiate a 3D object and include the 3D object within the 3D spatial model. Instantiation of the 3D object can involve creation of 3D object model data that is stored within data structures in memory. The data structures can be dynamic in the sense that 3D objects can move within the 3D spatial model as the corresponding feature moves within the real world. Accordingly, the processing system 1302 can continuously update the location and/or other characteristics of a 3D object described by the corresponding data structure maintained by the processing system in memory 1310 as the processing system 1302 captures additional 3D point clouds of a scene and the semantic segmentation pipeline continues to annotate points within the 3D point clouds with annotations corresponding to the location of a particular 3D object persisting within a 3D spatial model. In many embodiments, the processing system 1302 relies upon a game engine to manage updates to 3D object models. In other embodiments, 3D object models are updated using any technique appropriate to the requirements of a given application.

In many embodiments, the 3D object model data includes audio labels that can be utilized by the processing system 1302 to generate spatial sound. In the illustrated embodiment, the system includes left and right speakers 1320, 1322 and the processing system generates left and right audio channels based upon an audio label of a 3D object to generate a spatial sound. The specific characteristics of the spatial sound are determined based upon the pose of the head of the user relative to the location of the 3D object within the 3D spatial model. In this way, the system can present spatial sound that the user perceives as originating from a location in the real world that corresponds to the location of the 3D object within the 3D spatial model. In many systems, the speakers are head mounted but do not cover the ears to enable the wearer to experience a mixed reality auditory experience in which the user hears both spatial sound generated by the system and natural sound. In several embodiments, a similar effect can be achieved using headphones. As can readily be appreciated, the specific system utilized to generate sound is largely dependent upon the requirements of a given application. In a number of embodiments, additional audio channels are generated by the system and/or different techniques are utilized to generate spatial sound. As can readily be appreciated, the effectiveness with which spatial sound can be generated can be dependent upon the accuracy with which the pose of the users head can be determined.

In many instances, the system includes a network interface 1324. The network interface 1324 can be any of a variety of wired and/or wireless interfaces including (but not limited to) a BLUETOOTH wireless interface, and/or a WIFI wireless interface. In several embodiments, the wireless interface 1324 can be used to download a floor plan or map of the surrounding environment and can use SLAM to perform localization relative to the map. In several embodiments, segmentation pipelines specific to a particular environment can be retrieved via the network interface concerning people, objects, and/or structures that may be present within a particular environment that enhances the ability of the system to detect the presence and/or location of the specific people, objects and/or structures during spatial exploration of the environment. As can readily be appreciated, systems can receive and/or retrieve any of a variety of different types of information via a network interface 1324 that can be useful to specific 3D point cloud segmentation applications as appropriate to the requirements of those applications.

Referring again to FIG. 13, the system 1300 includes one or more mixed reality displays 1326 that can be utilized to display synthetic or virtual 3D objects within the field of view of a user. For example, many systems utilize mixed reality displays 1326 to display 3D virtual guides. The 3D virtual guide can be represented as a 3D object stored as a 3D object model within the memory 1310 of the system 1300. The processing system 1302 can animate the displayed 3D virtual guide in a manner responsive to sensor data captured by the sensor systems that is indicative of movement of the user and/or within the real world environment (e.g. movement of other objects or people). The manner in which 3D virtual guides are displayed and/or animated is largely dependent upon the requirements of a given application. Furthermore, the use of semantic labels obtained by semantic segmentation of 3D point clouds generated by the sensor systems is not limited to the provision of 3D virtual guides. As can readily be appreciated, the semantic labels can be utilized within a variety of applications limited only by the capabilities of the specific hardware on which the semantic segmentation pipeline utilized to generate the semantic labels is implemented.

While a number of specific hardware platforms and/or implementations of systems are described above with reference to FIG. 13, any of a variety of hardware platforms and/or implementations incorporating a variety of sensor systems, output modalities, and/or processing capabilities can be utilized as appropriate to the requirements of specific applications to perform semantic segmentation of 3D point clouds in accordance with various embodiments of the invention.

Although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What is claimed is:

1. A system for performing semantic segmentation of a 3D point cloud, comprising:
   at least one processor; and
   a memory containing a segmentation pipeline application;
   wherein the segmentation pipeline application configures the at least one processor to:
      pre-process a 3D point cloud to group 3D points;
      provide the groups of 3D points to a 3D neural network to generate initial label predictions for the groups of 3D points;
      interpolate label predictions for individual 3D points based upon initial label predictions for at least two neighboring groups of 3D points including the group of 3D points to which a given individual 3D point belongs;
      refine the label predictions using a graph neural network; and
      output a segmented 3D point cloud.

2. The system of claim 1, wherein:
   the segmentation pipeline application configures the at least one processor to group 3D points into voxels; and
   the 3D neural network is a three dimensional fully convolutional neural network (3D-FCNN).

3. The system of claim 2, wherein the interpolation is a trilinear interpolation.

4. The system of claim 3, wherein the trilinear interpolation is implemented as an additional layer of the 3D-FCNN.

5. The system of claim 3, wherein the trilinear interpolation of an initial label prediction for a given 3D point is based upon a weighted sum of the initial label predictions assigned to the eight nearest neighboring voxel centers to the given 3D point.

6. The system of claim 5, wherein the weighted sum is based upon distance between the given 3D point and voxel centers.

7. The system of claim 3, wherein the graph neural network is a Conditional Random Field (CRF).

8. The system of claim 1, wherein the 3D neural network and the graph neural network are jointly trained.

9. The system of claim 1, wherein the interpolation is a trilinear interpolation.

10. The system of claim 1, wherein the segmentation pipeline application configures the at least one processor to refine the label predictions applied to individual 3D points using the graph neural network.

11. The system of claim 1, wherein the segmentation pipeline application configures the at least one processor to refine the label predictions applied to groups of 3D points using the graph neural network.

12. A method training a segmentation pipeline, comprising:
performing a first training stage using a computing system, where the first training stage comprises optimizing a 3D Neural Network (3D NN) using a training data set comprising sets of 3D points with semantic annotations to obtain an optimized 3D NN, wherein the 3D NN comprises a trilinear interpolation layer to map voxel-wise predictions to point-wise predictions; and
performing a second training stage using the computing system and the optimized 3D NN, where the second training stage comprises optimizing over a joint framework comprising the optimized 3D NN and a graph neural network that outputs 3D point semantic labels using the training data set.

13. The method of claim 12, wherein:
the first training stage comprises forming voxels using each set of 3D points in the training data set; and
the 3D NN is a three dimensional fully convolutional neural network (3D-FCNN).

14. The method of claim 13, wherein mapping a voxel-wise prediction to a point-wise prediction for a given 3D point is based upon a weighted sum of the voxel-wise predictions assigned to the eight nearest neighboring voxel centers to the given 3D point.

15. The method of claim 14, wherein the weighted sum is based upon distance between the given 3D point and voxel centers.

16. The method of claim 12, wherein the graph neural network is a Conditional Random Field (CRF).

17. The method of claim 16, wherein the second training stage comprises jointly training the 3D-FCNN and CRF using the training data set.

18. The method of claim 12 further comprising performing geometric augmentation of the training data set.

19. The method of claim 18, wherein performing geometric augmentation of the training data set comprises at least one process selected from the group consisting of:
random rotation of each set of 3D data points in the training data set;
random scaling of each set of 3D data points in the training data set; and
jittering of the 3D coordinates of 3D data points within each set of 3D data points in the training data set.

20. A system for performing semantic segmentation of a 3D point cloud, comprising:
at least one display device;
at least one sensor system comprising a depth sensor and at least one camera;
at least one processor;
a memory containing a segmentation pipeline application;
wherein the segmentation pipeline application configures the at least one processor to:
capture sensor data using the at least one sensor system;
generate a 3D point cloud of a scene based upon the captured sensor data;
pre-process the 3D point cloud to group 3D points into voxels;
provide the voxels to a three dimensional fully convolutional neural network (3D-FCNN) to generate initial label predictions for the voxels;
interpolate label predictions for individual 3D points based upon initial label predictions using trilinear interpolation;
refine the label predictions using a Conditional Random Field (CRF);
output a segmented 3D point cloud based upon the label predictions;
generate a 3D mesh using the segmented 3D point cloud;
render the 3D mesh; and
display the rendered 3D mesh via the at least one display device.

* * * * *